(12) United States Patent
Aurongzeb et al.

(10) Patent No.: US 10,732,919 B2
(45) Date of Patent: Aug. 4, 2020

(54) METHOD AND APPARATUS FOR DETERMINING TREATMENT OF CROSS-SCREEN CONTENT FOR A DUAL SEGMENTED DISPLAY

(71) Applicant: DELL PRODUCTS, LP, Round Rock, TX (US)

(72) Inventors: Deeder M. Aurongzeb, Austin, TX (US); Keith M. Alfano, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 21 days.

(21) Appl. No.: 16/012,312

(22) Filed: Jun. 19, 2018

(65) Prior Publication Data

US 2019/0384558 A1    Dec. 19, 2019

(51) Int. Cl.
*G06F 3/14* (2006.01)
*G06F 1/16* (2006.01)
*G06F 3/0488* (2013.01)
*G06F 3/041* (2006.01)

(52) U.S. Cl.
CPC .......... *G06F 3/1446* (2013.01); *G06F 1/1652* (2013.01); *G06F 3/04883* (2013.01); *G06F 3/1431* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 9,606,664 B2 | 3/2017 | Knepper et al. | |
| 2010/0225601 A1* | 9/2010 | Homma | G06F 3/0416 345/173 |
| 2012/0050177 A1* | 3/2012 | Simmons | G06F 1/1641 345/173 |
| 2012/0105346 A1* | 5/2012 | Chen | G06F 3/04883 345/173 |
| 2015/0130725 A1* | 5/2015 | Knepper | G06F 1/1643 345/173 |
| 2018/0329574 A1* | 11/2018 | Klein | G06F 1/1616 |

* cited by examiner

*Primary Examiner* — Stephen T. Reed
(74) *Attorney, Agent, or Firm* — Larson Newman, LLP (57) ABSTRACT

An information handling system includes first and second displays, and a display controller. The display controller provides a visual output to the first and second display based on a display mode. A processor selects a mask display mode as a default display mode, determines a content type of the visual output, selects a split display mode when the content type is a first content type, determines a physical flatness of the information handling system when the content type is a second content type, and selects the split display mode when the physical flatness is greater than a flatness threshold.

20 Claims, 6 Drawing Sheets

METHOD AND APPARATUS FOR DETERMINING TREATMENT OF CROSS-SCREEN CONTENT FOR A DUAL SEGMENTED DISPLAY

FIELD OF THE DISCLOSURE

The present disclosure generally relates to information handling systems, and more particularly relates to an information handling system to determine treatment of cross-screen content for a dual segmented display.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes first and second displays, and a display controller. The display controller may provide a visual output to the first and second display based on a display mode. A processor may select a mask display mode as a default display mode, may determine a content type of the visual output, may select a split display mode when the content type is a first content type, may determine a physical flatness of the information handling system when the content type is a second content type, and may select the split display mode when the physical flatness is greater than a flatness threshold.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
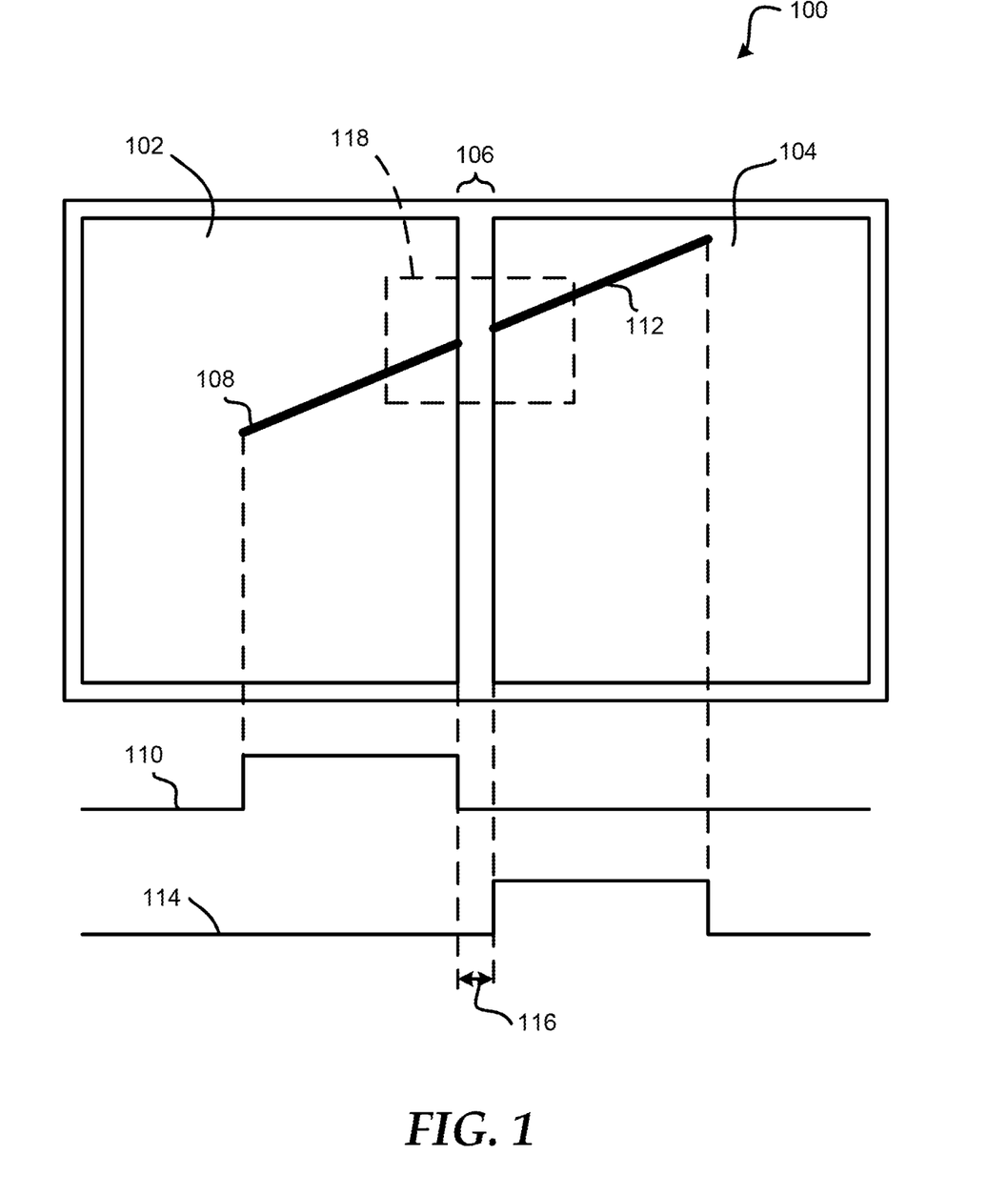
FIG. 1 is a diagram of an information handling system according to at least one embodiment of the disclosure.

FIG. 1 shows a dual display information handling system 100 including displays 102 and 104, and physical gap 106 between the displays 102 and 104. In an embodiment, the information handling system can be a portable and can be foldable, such as a clamshell design that can rotate from zero to three hundred and sixty degrees. In an embodiment, the information handling system 100 can fold from a closed position, to a flat orientation position, to a fully open position, and any position between these positions. In an embodiment, the information handling system 100 is the flat orientation position when the displays 102 and 104 are substantially inline with each other. In an embodiment, the information handling system 100 is in the fully open position when the displays 102 and 104 are facing substantially opposite directions from each other.

Different visual outputs can be provided on the displays 102 and 104 based on an application being executed by a processor of the information handling system 100. For example, the visual output can be a map, a photograph, icons, a dialog window, movie, digital ink, a display associated with a word processing application, or the like. In an embodiment, the visual outputs can be displayed on the displays 102 and 104 in a split display mode, a mask display mode, or the like. In an embodiment, a display controller can split the visual output and provide half of the visual output as a separate visual output to each of the displays 102 and 104 while in the split display mode. In an embodiment, a display controller, such as display controller 208 of FIG. 2, can provide the visual output as a single output to both of the displays 102 and 104 with a portion of the visual output located at the location of the physical gap 106 masked from display while in the mask display mode.

Figure 2:
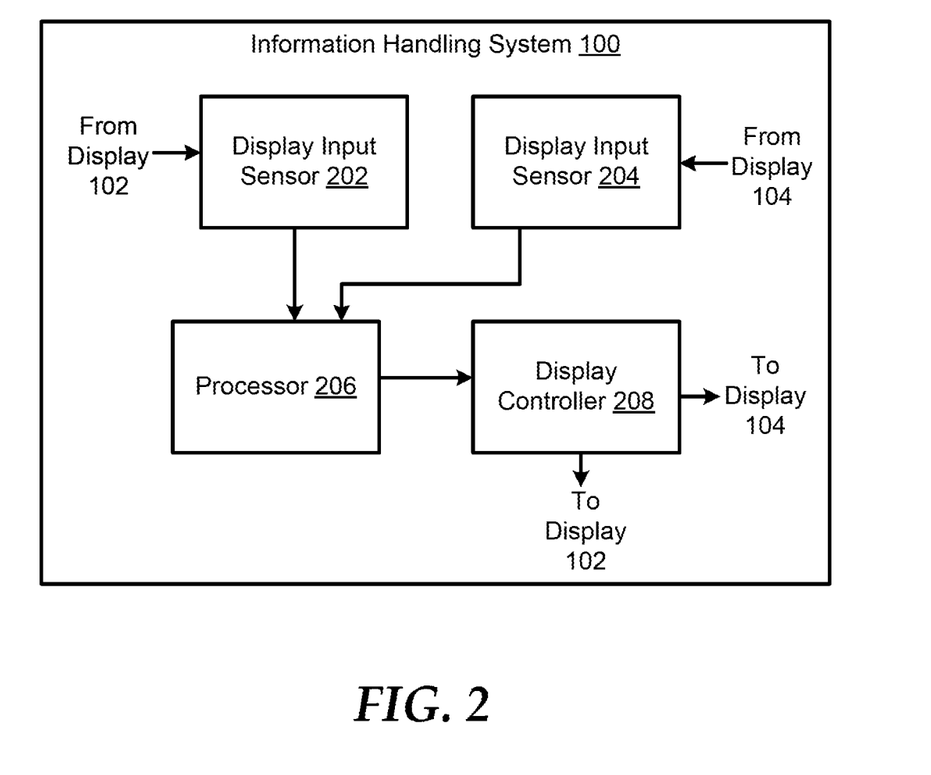
FIG. 2 is a block diagram of a portion of the information handling system according to at least one embodiment of the present disclosure.

FIG. 2 illustrates a block diagram of a portion of the information handling system 100, which includes display input sensors 202 and 204, a processor 206, and a display controller 208. In an embodiment, the displays 102 and 104 can be touch display screens, such that inputs from a finger, pen, or the like can be detected and provided to the display input sensors 202 and 204. In an embodiment, display input sensor 202 can receive inputs from display 102 and display input sensor 204 can receive inputs from display 104. In another embodiment, the display input sensors 202 and 204 can be combined into a single display input sensor to receive inputs from both displays 102 and 104 without varying from the scope of this disclosure. The operation selecting different display modes for the displays 102 and 104 of information handling system 100 will be described with respect to FIGS. 1-3.

Referring now to FIG. 1, a user can execute different applications on the information handling system 100 that can provide different visual outputs to the displays 102 and 104, such as maps, digital ink for a drawing application, multiple icons, movies, photographs, or the like. Referring now to FIG. 2, in an embodiment, the processor 206 can select a default display mode for the displays 102 and 104, such as a mask display mode, and provide the mask display mode to the display controller 208. The display controller 208 can then provide visual outputs to the displays 102 and 104 based on the mask display mode.

In another embodiment, the processor 206 may not select a default display mode, but the processor 206 can select a display mode based on a content type for an application being executed within the information handling system 100. For example, the processor 206 can determine whether the content on displays 102 and 104 includes digital ink drawn by a user on the displays 102 and 104. In an embodiment, this determination can be made based on inputs received from one or both of the display input sensors 202 and 204, which in turn can provide the inputs to the processor 206. If the processor 206 does not receive an indication that digital ink is detected by one or both of the display input sensors 202 and 204, then the processor can determine that the content does not include digital ink, and can select the split display mode for display of visual output on the display 102 and 104. In an embodiment, while in the split display mode, the display controller 208 can split the visual output and provide half of the visual output as a visual output to display 102 and the other half of the visual output to display 104. The split display mode can be beneficial for the visual experience when so that content is not lost at the physical gap 106 shown in FIG. 1. For example, if multiple icons are being provided on display 102 and 104, the split display mode can ensure that an entire icon is located on either display 102 or display 104 and not split between the displays 102 and 104 or masked behind the physical gap 106. In an embodiment, the split display mode can cause the display controller 208 to snap icons to one of the displays 102 and 104 or the other.

When the processor 206 receives an indication of digital ink from display input sensor 202 and/or 204, the processor 206 can then determine a physical flatness of the information handling system 100. In an embodiment, a desired flatness or flatness threshold of the information handling system 100 can be substantially equal to 180 degrees. In an embodiment, the processor 206 can receive the physical flatness of the information handling system 100 from other components within the information handling system 100, such as sensors within a hinge of information handling system 100. When the processor 206 determines that the physical flatness is not substantially equal to the flatness threshold, the processor 206 can select the split display mode for the visual outputs provided to the displays 102 and 104 by the display controller 208. In an embodiment, the physical flatness of the information handling system 100 can affect an amount of concave along the physical gap 106. For example, if the information system is substantially flat, the amount of concave within the physical gap 106 can be less than an amount easily detected by a user with a pen, such as 0.4 mm, 0.5 mm, 0.6 mm, or the like drop or difference from the displays 102 and 104 to a lowest point within the physical gap.

The processor 206 can then determine the size of the physical gap 106. In an embodiment, this determination can be made by the processor 206 accessing a memory of the information handling system 100 where the width of the physical gap 106 is stored. The processor 206 can then compare the width of the physical gap 106 to a gap threshold. In an embodiment, the gap threshold can be predetermined within the information handling system 100, can be set by a user of the information handling system 100, can be predetermined and then changed by a user, or the like. In an embodiment, the gap threshold can be 8 mm, 9 mm, 10 mm, 11 mm, or the like. When the processor 206 determines that the physical gap is not less than the gap threshold, the processor 206 can select the split display mode for the visual outputs provided to the displays 102 and 104 by the display controller 208.

During operation, the display input sensor 202 can measure a length of a digital ink mark, such as digital ink 108, and a length of time that the digital ink mark 108 is detected on the display 102. In an embodiment, the length of time for the digital ink mark 108 can be represented by a high value within the line 110 of FIG. 1. In an embodiment, the processor 206 can receive the length and the length of time for the digital ink mark 108 from the display input sensor 202, and the processor 206 can calculate a velocity of the digital ink mark 108 as the digital ink mark 108 exits display 102. Similarly, the display input sensor 204 can measure a length of a digital ink mark, such as digital ink mark 112, and a length of time that the digital ink mark 112 is detected on the display 104. The length of time for the digital ink mark 112 can be represented by a high value within the line 114 of FIG. 1. In an embodiment, the processor 206 can receive the length and the length of time for the digital ink mark 112 from the display input sensor 204, and the processor 206 can calculate a velocity of the digital ink mark 112 as the digital ink mark 112 enters display 104. The processor 206 can then compare the exit velocity of the digital ink mark 108 and the entry velocity of the digital ink mark 112. If the exit and entry velocities match then the processor 206 can determine that a continuous line was meant to be drawn by the user, such that the length of time, illustrated by the time 116, that the pen was within the physical gap 106 corresponds to the exit and entry velocities of the digital ink marks 108 and 112.

Figure 3:
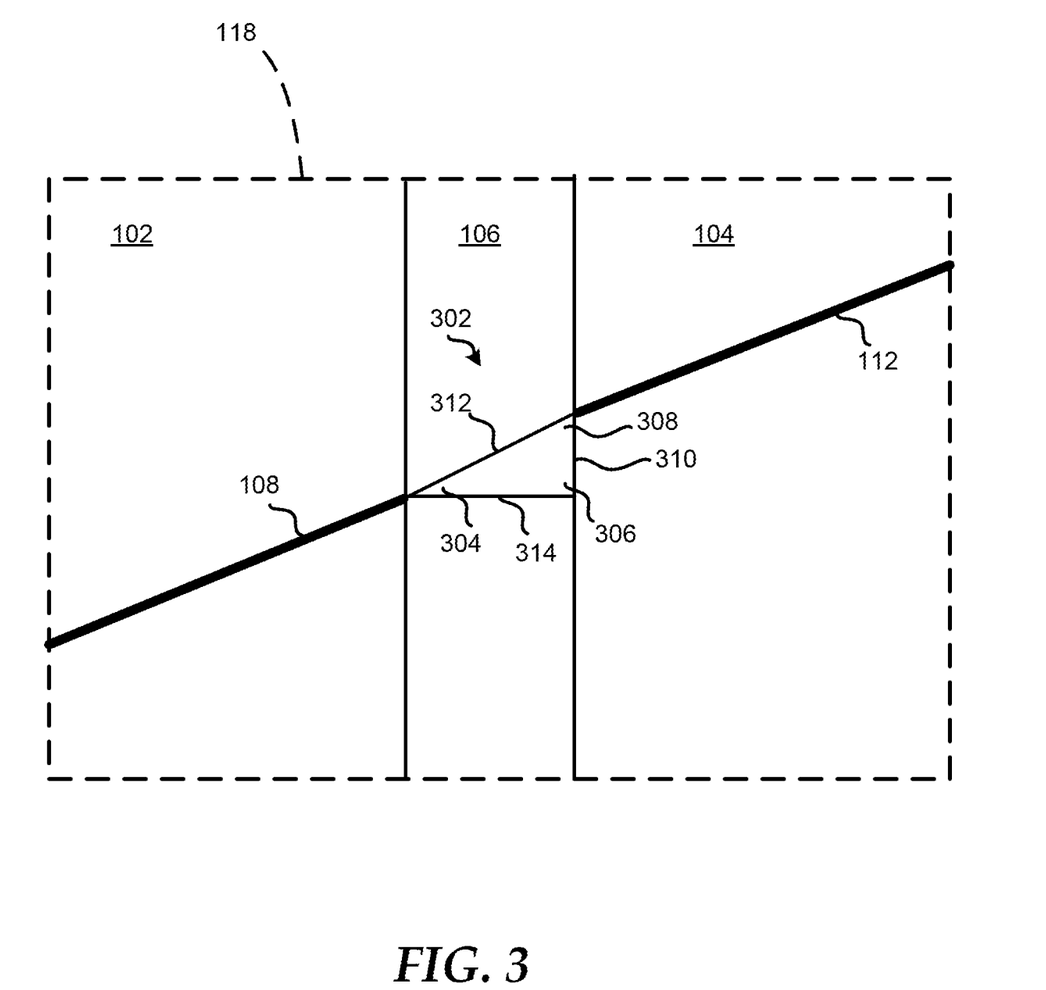
FIG. 3 is a diagram of an enlarged portion of first and second displays of the information handling system according to at least one embodiment of the present disclosure.

However, if the exit and entry velocities of the digital ink marks 108 and 112 do not match, the processor 206 can select the split display mode for the visual outputs provided to the displays 102 and 104 by the display controller 208. In an embodiment, the comparison of the velocities of the digital marks 108 and 112 can override the use of the physical flatness of the information handling system 100 and size of the physical gap 106 in selecting either the split display mode or the mask display mode. The processor 206 can also receive an exit angle of the digital ink mark 108 from display input sensor 202 and an entry angle of the digital ink mark 112 from display input sensor 204. The processor 206 can then calculate whether the exit and entry angles correspond with each other. In an embodiment, the exit and entry angles of the digital marks 108 and 112 match if the entry angle is the compliment angle of the exit angle. For example, a right-triangle 302, as shown in FIG. 3 of the enlarged portion 118 of displays 102 and 104 and physical gap 106, can be utilized with an exit angle 304, a right angle 306, and an entry angle 308 to determine whether the exit and entry angles of the digital marks 108 and 112 correspond with each other. In an embodiment, if the exit angle 304 and entry angle add up to 90 degrees, such as the exit angle 304 being 30 degrees and the entry angle 308 being 60 degrees, the processor 206 can determine that the exit and entry angles of the digital marks 108 and 112 correspond with each other. However, if the exit angle 304 and entry angle do not add up to 90 degrees, such as the exit angle 304 being 45 degrees and the entry angle 308 being 60 degrees, the processor 206 can determine that the exit and entry angles of the digital marks 108 and 112 do not correspond with each other, and the processor 206 can select the split display mode for the visual outputs provided to the displays 102 and 104 by the display controller 208.

The processor 206 can then utilize right-triangle trigonometry to check whether a distance between the digital marks 108 and 112 is correct. For example, using the exit angle 304 of 30 degrees and the entry angle of 60 degrees above, the lengths of the sides 310, 312, and 314 of the right-triangle 302 should correspond to one another as follows: the length of side 312 should be two times the length of side 310, and the length of side 314 should be the length of side 310 multiplied by the square root of 3. Thus, if the processor 206 calculates these lengths to correlate with one another as shown above, the processor 206 can determine that the distance between the digital ink marks 108 and 112 is correct. In an embodiment, the display input sensor 202 can provide a location that the digital ink mark 108 left the display 102, and the display input sensor 204 can provide a location that the digital ink mark 112 entered the display 104. The processor 206 can utilize these locations in determining the distance between the digital ink marks 108 and 112.

If the distance between the digital ink marks 108 and 112 does not correlate with the exit angle 304 and entry angle 308, then the processor 206 can select the split display mode for the visual outputs provided to the displays 102 and 104 by the display controller 208. If the distance does correlate with the exit angle 304 and entry angle 308, then the processor 206 can select the mask display mode for visual outputs provided to the displays 102 and 104 by the display controller 208. The selection between the split display mode and the mask display mode based on the criteria described above can provide a user with a better visual experience over selecting the display mode only on a size of the physical gap.

Figure 4:
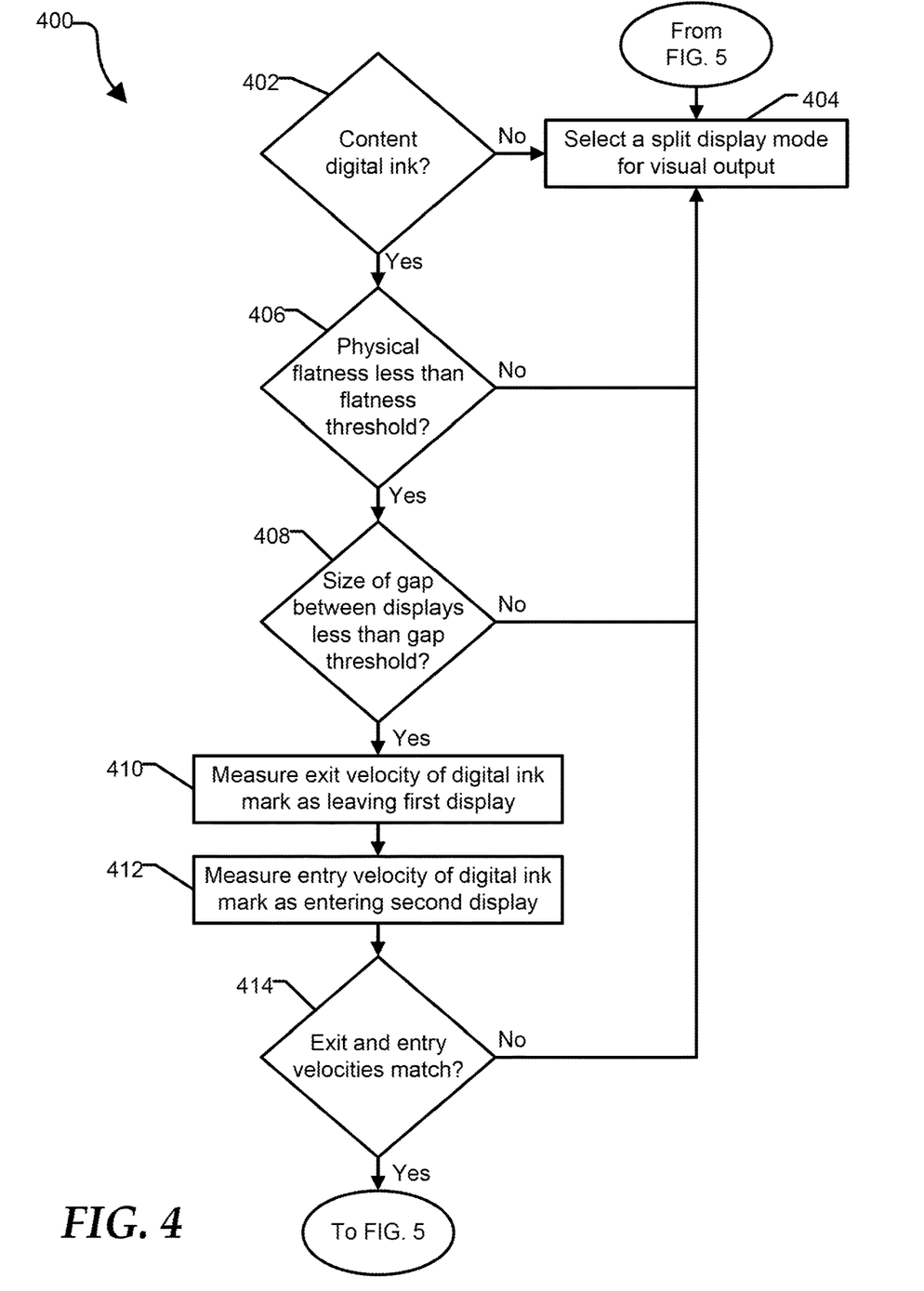
FIGS. 4 and 5 are a flow diagram of a method for selecting between a split display mode and a mask display mode according to at least one embodiment of the present disclosure.
Figure 5:
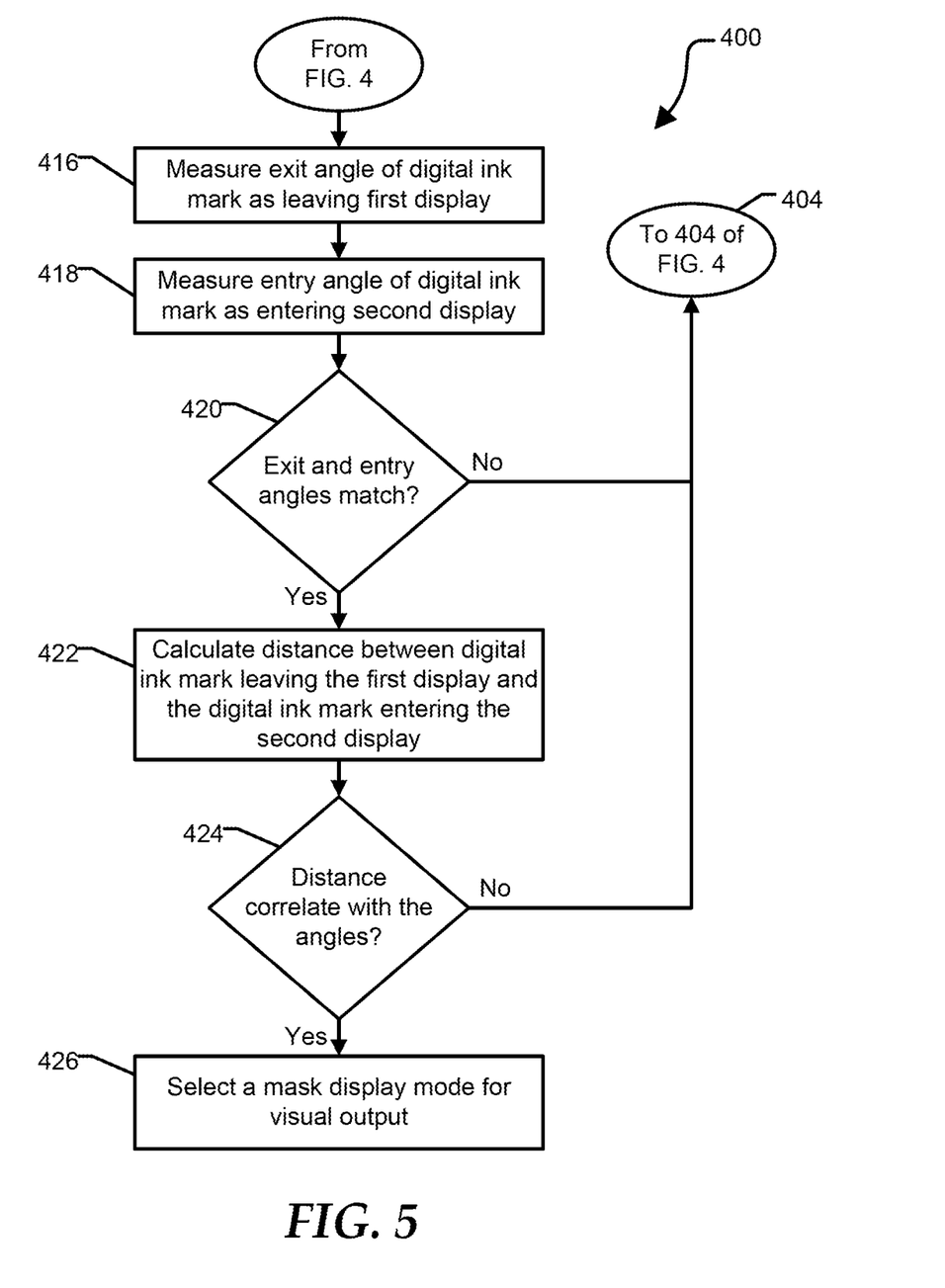

FIGS. 4 and 5 illustrate a flow diagram of a method 400 for selecting a split display mode or a mask display mode for a visual output of an information handling system according to at least one embodiment of the present disclosure. At block 402, a determination is made whether the content for first and second displays on an information handling system is digital ink. If the content is not digital ink, a split display mode is selected for display of visual output on the first and second displays at block 404. In an embodiment, a display controller can split the visual output and provide half of the visual output as a separate visual output to each of the first and second displays while in the split display mode. If the content is digital ink, a determination can be made whether a physical flatness is substantially equal to a flatness threshold at block 406. In an embodiment, the physical flatness threshold can be 180 degrees.

If the physical flatness of the information handling system is not substantially equal to the physical flatness threshold, then the split display mode is selected for display of visual output on the first and second displays at block 404. If the physical flatness of the information handling system is substantially equal to the physical flatness threshold, then a determination is made is whether a physical gap between the first and second displays is less than a gap threshold at block 408. In an embodiment, the gap threshold can be 8 mm, 9 mm, 10 mm, 11 mm, or the like. If the physical gap is not less than the gap threshold, then the split display mode is selected for display of visual output on the first and second displays at block 404. If the physical gap is less than the gap threshold, then an exit velocity of a digital ink mark is measured as the digital ink mark leaves the first display at block 410.

At block 412, an entry velocity of the digital ink mark is measured as the digital ink mark enters the second display. At block 414, a determination is made whether the exit and entry velocities match. If the exit and entry velocities do not match, then the split display mode is selected for display of visual output on the first and second displays at block 404. If the exit and entry velocities do match, then referring to FIG. 5, an exit angle of the digital ink mark is measured as the digital ink mark leaves the first display at block 416. At block 418, an entry angle of the digital ink mark is measured as the digital ink mark enters the second display. At block 420, a determination is made whether the exit and entry angles match. In an embodiment, the exit and entry angles match if the entry angle is the compliment angle of the exit angle.

If the exit and entry angles do not match, then the split display mode is selected for display of visual output on the first and second displays at block 404 of FIG. 4. If the exit and entry angles match, a distance between the digital ink mark leaving the first display and the digital ink mark entering the second display is calculated at block 422. At block 424, a determination is made whether the distance correlates with the exit and entry angles. In an embodiment, the right-triangle trigonometry can be used to check whether the distance between the exit and entry of the digital ink mark calculates correctly with the exit and entry angles. If the distance does not correlate with the exit and entry angles, then the split display mode is selected for display of visual output on the first and second displays at block 404 of FIG. 4. If the distance does correlate with the exit and entry angles, then a mask display mode for the visual output is selected at block 426. In an embodiment, a display controller can provide the visual output as a single output to both of the displays with a portion of the visual output located at the location of the physical gap masked from display while in the mask display mode.

Figure 6:
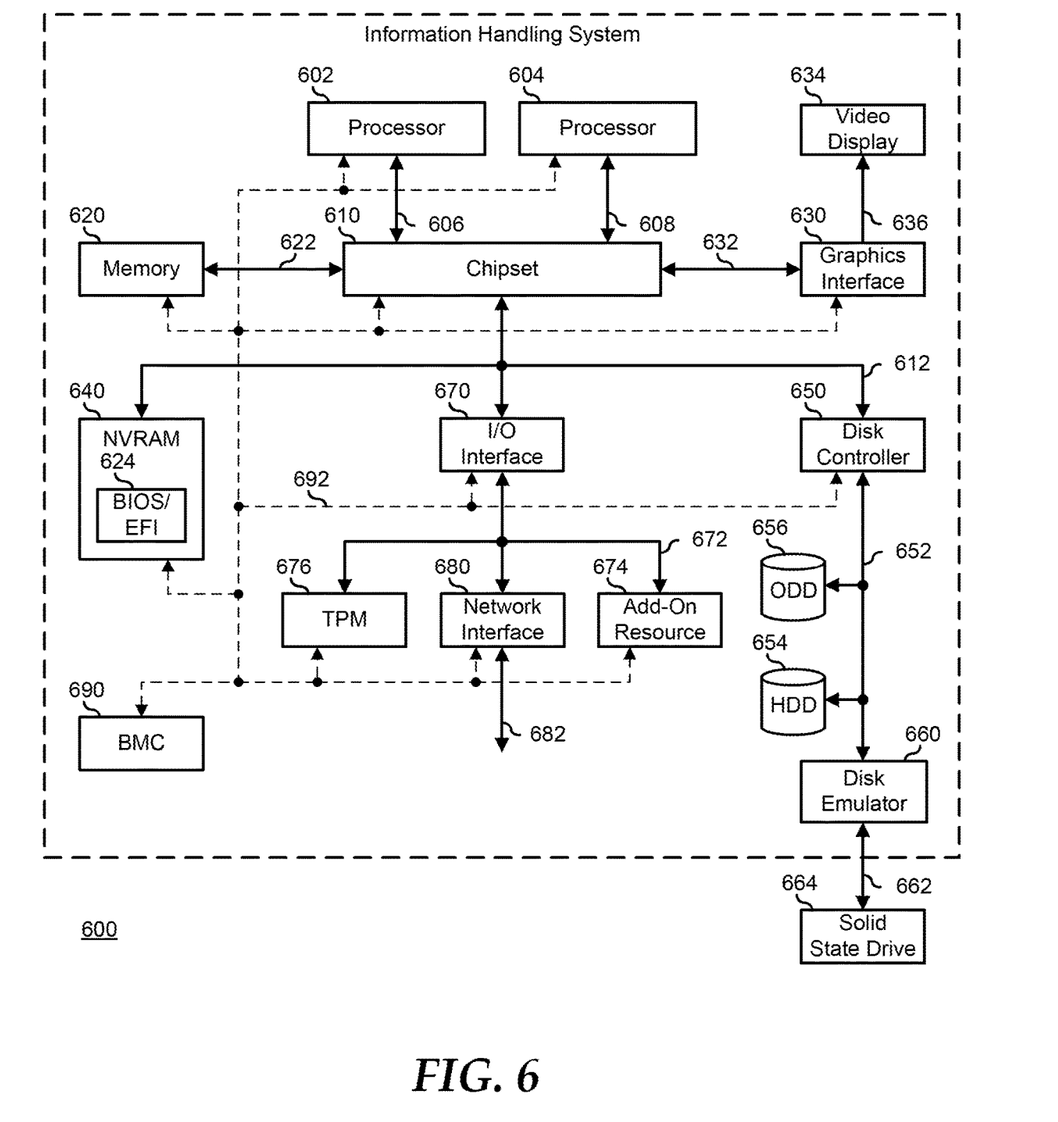
FIG. 6 is a block diagram of a general information handling system according to an embodiment of the present disclosure.

FIG. 6 illustrates an embodiment of a general information handling system 600, such as information handling system 100, including processors 602 and 604, a chipset 610, a memory 620, a graphics adapter 630 connected to a video display 634, a non-volatile RAM (NV-RAM) 640 that includes a basic input and output system/extensible firmware interface (BIOS/EFI) module 642, a disk controller 650, a hard disk drive (HDD) 654, an optical disk drive 656, a disk emulator 660 connected to a solid state drive (SSD) 664, an input/output (I/O) interface 670 connected to an add-on resource 674 and a trusted platform module (TPM 676, a network interface 680, and a baseboard management controller (BMC) 690. Processor 602 is connected to chipset 610 via processor interface 606, and processor 604 is connected to the chipset via processor interface 608. In a particular embodiment, processors 602 and 604 are connected together via a high-capacity coherent fabric, such as a HyperTransport link, a QuickPath Interconnect, or the like.

Chipset 610 represents an integrated circuit or group of integrated circuits that manages the data flows between processors 602 and 604 and the other elements of information handling system 600. In a particular embodiment, chipset 610 represents a pair of integrated circuits, such as a northbridge component and a southbridge component. In another embodiment, some or all of the functions and features of chipset 610 are integrated with one or more of processors 602 and 604. Memory 620 is connected to chipset 610 via a memory interface 622. An example of memory interface 622 includes a Double Data Rate (DDR) memory channel and memory 620 represents one or more DDR Dual In-Line Memory Modules (DIMMs). In a particular embodiment, memory interface 622 represents two or more DDR channels. In another embodiment, one or more of processors 602 and 604 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 620 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 630 is connected to chipset 610 via a graphics interface 632, and provides a video display output 636 to a video display 634. An example of a graphics interface 632 includes a Peripheral Component Interconnect-Express (PCIe) interface and graphics adapter 630 can include a four lane (×4) PCIe adapter, an eight lane (×8) PCIe adapter, a 66-lane (×16) PCIe adapter, or another configuration, as needed or desired. In a particular embodiment, graphics adapter 630 is provided down on a system printed circuit board (PCB). Video display output 636 can include a Digital Video Interface (DVI), a High-Definition Multimedia Interface (HDMI), a DisplayPort interface, or the like, and video display 634 can include a monitor, a smart television, an embedded display such as a laptop computer display, or the like.

NV-RAM 640, disk controller 650, and I/O interface 670 are connected to chipset 610 via an I/O channel 612. An example of I/O channel 612 includes one or more point-to-point PCIe links between chipset 610 and each of NVRAM 640, disk controller 650, and I/O interface 670. Chipset 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 640 includes BIOS/EFI module 642 that stores machine-executable code (BIOS/EFI code) that operates to detect the resources of information handling system 600, to provide drivers for the resources, to initialize the resources, and to provide common access mechanisms for the resources. The functions and features of BIOS/EFI module 642 will be further described below.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive (SSD) 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to add-on resource 674, to TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes a network channel 682 that provides an interface to devices that are external to information handling system 600. In a particular embodiment, network channel 682 is of a different type than peripheral channel 672 and network interface 680 translates information from a format suitable to the peripheral channel to a format suitable to external devices. An example of network channel 682 includes an InfiniBand channel, a Fibre Channel channel, a Gigabit Ethernet channel, a proprietary channel architecture, or a combination thereof. Network channel 682 can be connected to an external network resource (not illustrated). The network resource can include another information handling system, a data storage system, another network, a grid management system, another suitable resource, or a combination thereof.

BMC 690 is connected to multiple elements of information handling system 600 via one or more management interface 692 to provide out of band monitoring, maintenance, and control of the elements of the information handling system. As such, BMC 690 represents a processing device different from processor 602 and processor 604, which provides various management functions for information handling system 600. For example, BMC 690 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 680 can vary considerably based on the type of information handling system. BMC 690 can operate in accordance with an Intelligent Platform Management Interface (IPMI). Examples of BMC 690 include an Integrated Dell Remote Access Controller (iDRAC). Management interface 692 represents an out of band communication interface to between BMC 690 and the elements of information handling system 600, and can include an Inter-Integrated Circuit (I2C) bus, a System Management Bus (SMBUS), a Power Management Bus (PMBUS), or the like. As used herein, out-of-band access refers to operations performed apart from a BIOS/operating system execution environment on information handling system 600, that is apart from the execution of code by processors 602 and 604 and procedures that are implemented on the information handling system in response to the executed code.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a first display;
a second display;
a display controller to provide a visual output to the first and second displays based on a display mode that includes a mask display mode and a split display mode; and
a processor in communication with the display controller, the processor to compare a physical flatness of the first display and the second display to a flatness threshold, to compare a physical gap between the first display and the second display to a gap threshold when the physical flatness is less than the flatness threshold, and to select the mask display mode based upon an exit velocity from the first display and an entry velocity in the second display when the physical gap is less than the gap threshold.

2. The information handling system of claim 1 further comprising a memory controller to split the visual output while in the split display mode, to output a first portion of the visual output on the first display, and to output a second portion of the visual output on the second display.

3. The information handling system of claim 1 further comprising a memory controller to output the visual output on both the first and second displays while in the mask display mode, and to mask a portion of the visual output located at the physical gap between the first and second displays.

4. The information handling system of claim 1, wherein the split display mode includes a first content type that is selected from a group including a map, a photograph, and word processing application.

5. The information handling system of claim 1, wherein the mask display mode includes a second content type including a digital ink.

6. The information handling system of claim 1, the processor further to determine whether the exit velocity of a first line drawn on the first display matches the entry velocity of a second line drawn on the second display, to determine whether a first trajectory of the first line matches a second trajectory of the second line in response to the exit velocity matching the entry velocity, to select the mask display node when the first and second trajectories match, and to select the split display mode when the first and second trajectories do not match.

7. The information handling system of claim 6, the processor further to determine whether the first trajectory of the first line matches the second trajectory of the second line in response to the exit velocity matching the entry velocity, to select the mask display node when the first and second trajectories match, and to select the split display mode when the first and second trajectories do not match.

8. A method comprising:
comparing, by a processor, a physical flatness of first and second displays to a flatness threshold;
comparing a physical gap between the first display and the second display to a gap threshold when the physical flatness is less than the flatness threshold; and
selecting a visual output that includes a mask display mode and a split display mode,
wherein the mask display mode is selected based upon an exit velocity from the first display and an entry velocity in the second display when the physical gap is less than the gap threshold.

9. The method of claim 8, further comprising:
splitting the visual output while in the split display mode;
outputting a first portion of the visual output on the first display; and
outputting a second portion of the visual output on the second display.

10. The method of claim 8, further comprising:
outputting the visual output on both the first and second displays while in the mask display mode; and
masking a portion of the visual output located at the physical gap between the first and second displays.

11. The method of claim 8, wherein the split display mode includes a first content type that is selected from a group including a map, a photograph, and word processing application.

12. The method of claim 8, wherein the mask display mode includes a second content type including a digital ink.

13. The method of claim 8, further comprising:
determining whether the exit velocity of a first line drawn on the first display matches the entry velocity of a second line drawn on the second display;
determining whether a first trajectory of the first line matches a second trajectory of the second line in response to the exit velocity matching the entry velocity;
selecting the mask display node when the first and second trajectories match; and
selecting the split display mode when the first and second trajectories do not match.

14. The method of claim 13, further comprising:
determining whether the first trajectory of the first line matches the second trajectory of the second line in response to the exit velocity matching the entry velocity;
selecting the mask display mode when the first and second trajectories match; and
selecting the split display mode when the first and second trajectories do not match.

15. A method comprising:
comparing, by a processor, a physical flatness of first and second displays of an information handling system to a flatness threshold;
comparing a physical gap between the first display and the second display to a gap threshold when the physical flatness is less than the flatness threshold;
selecting a visual output that includes a mask display mode and a split display mode,
wherein the mask display mode is selected based upon an exit velocity from the first display and an entry velocity in the second display when the physical gap is less than the flatness threshold, and wherein the mask display mode includes a digital link.

16. The method of claim 15, further comprising:
splitting the visual output while in the split display mode;
outputting a first portion of the visual output on the first display; and
outputting a second portion of the visual output on the second display.

17. The method of claim 15, further comprising:
outputting the visual output on both the first and second displays while in the mask display mode; and
masking a portion of the visual output located at the physical gap between the first and second displays.

18. The method of claim 15, further comprising:
determining whether the exit velocity of a first line drawn on the first display matches the entry velocity of a second line drawn on the second display;
determining whether the first trajectory of the first line matches the second trajectory of the second line in response to the exit velocity matching the entry velocity;
selecting the mask display node when the first and second trajectories match; and
changing from the mask display mode to the split display mode when the first and second trajectories do not match.

19. The method of claim 18, further comprising:
determining whether the first trajectory of the first line matches the second trajectory of the second line in response to the exit velocity matching the entry velocity;
selecting the mask display mode when the first and second trajectories match; and
changing from the mask display mode to the split display mode when the first and second trajectories do not match.

20. The method of claim 15, wherein the split display mode includes a first content type that is selected from a group including a map, a photograph, and word processing application.

* * * * *